United States Patent
Araki et al.

(10) Patent No.: US 8,024,363 B2
(45) Date of Patent: Sep. 20, 2011

(54) INFORMATION PROCESSING APPARATUS, INFORMATION PROCESSING METHOD, PROGRAM AND PROGRAM RECORDING MEDIUM

(75) Inventors: Takahiro Araki, Kanagawa (JP); Kevin Mark Whiting, Hampshire (GB); Hideki Ando, Hampshire (GB)

(73) Assignees: Sony Corporation (JP); Sony United Kingdom Limited (GB)

( * ) Notice: Subject to any disclaimer, the term of this patent is extended or adjusted under 35 U.S.C. 154(b) by 276 days.

(21) Appl. No.: 11/975,847

(22) Filed: Oct. 22, 2007

(65) Prior Publication Data

US 2008/0098023 A1    Apr. 24, 2008

(30) Foreign Application Priority Data

Oct. 24, 2006   (JP) ............................... P2006-288635

(51) Int. Cl.
*G06F 7/00*      (2006.01)
*G06F 17/30*     (2006.01)
(52) U.S. Cl. ...................................... 707/791; 707/795
(58) Field of Classification Search ............... 707/1–10, 707/100–104.1, 200–206, 600–831; 711/156; 386/66, 129
See application file for complete search history.

(56) References Cited

U.S. PATENT DOCUMENTS

| | | | | |
|---|---|---|---|---|
| 5,873,085 A * | 2/1999 | Enoki et al. | ..................... | 707/10 |
| 7,546,307 B2 * | 6/2009 | Terrell, II | ............................... | 1/1 |
| 2004/0117547 A1 * | 6/2004 | Ogihara et al. | ............... | 711/112 |
| 2005/0232589 A1 | 10/2005 | Kimura et al. | | |
| 2005/0270825 A1 * | 12/2005 | Tanaka et al. | ................. | 365/154 |

FOREIGN PATENT DOCUMENTS

JP    2005-243072 A    9/2005

OTHER PUBLICATIONS

Atsushi et al, A virtual file system for source program editing, Feb. 28, 2003, IEEE, 8 pages.*

* cited by examiner

*Primary Examiner* — Jean B Fleurantin
(74) *Attorney, Agent, or Firm* — Lerner, David, Littenberg, Krumholz & Mentlik, LLP (57) ABSTRACT

An information processing apparatus adapted to be connected for use to a media drive apparatus for recording data on or reproduced data from a recording medium having a file system includes a real file system acquiring section that acquires the file system of the recording medium from the media drive apparatus and a virtual file system providing section that converts the file system acquired by the file system acquiring section into a virtual file system having a directory/file structure different from the directory/file structure on the recording medium and provides it to an application program.

4 Claims, 10 Drawing Sheets

INFORMATION PROCESSING APPARATUS, INFORMATION PROCESSING METHOD, PROGRAM AND PROGRAM RECORDING MEDIUM

CROSS-REFERENCE TO RELATED APPLICATIONS

The present application claims priority from Japanese Patent Application No. JP 2006-288635, filed in the Japanese Patent Office on Oct. 24, 2006, the entire content of which is incorporated herein by reference.

BACKGROUND OF THE INVENTION

1. Field of the Invention

The present invention relates to an information processing apparatus, an information processing method, an information processing program and a program recording medium that can suitably be applied to a computer system including a media drive such as a disc drive for recording information in or reproducing information from a recording medium having a file system.

2. Description of the Related Art

Jpn. Pat. Appln. Laid-Open Publication No. 2005-243072 refers to a virtual file system that an optical disc drive generates by analyzing a real file system on an optical disc and combining the video data and the audio data recorded on the real file system in separate files to a single video/audio file.

U.S. Patent Publication No. 2005/0232589 discloses a technique of providing an access to a host (e.g., a personal computer) on the basis of a unit of virtual file by means of a serial bus protocol (SBP-2) command. With this technique, the virtual file system that the optical disc drive provides by means of an SBP-2 command is provided as a file input/output service to an application that is a user by means of a file system driver operating as a redirector.

Figure 10:
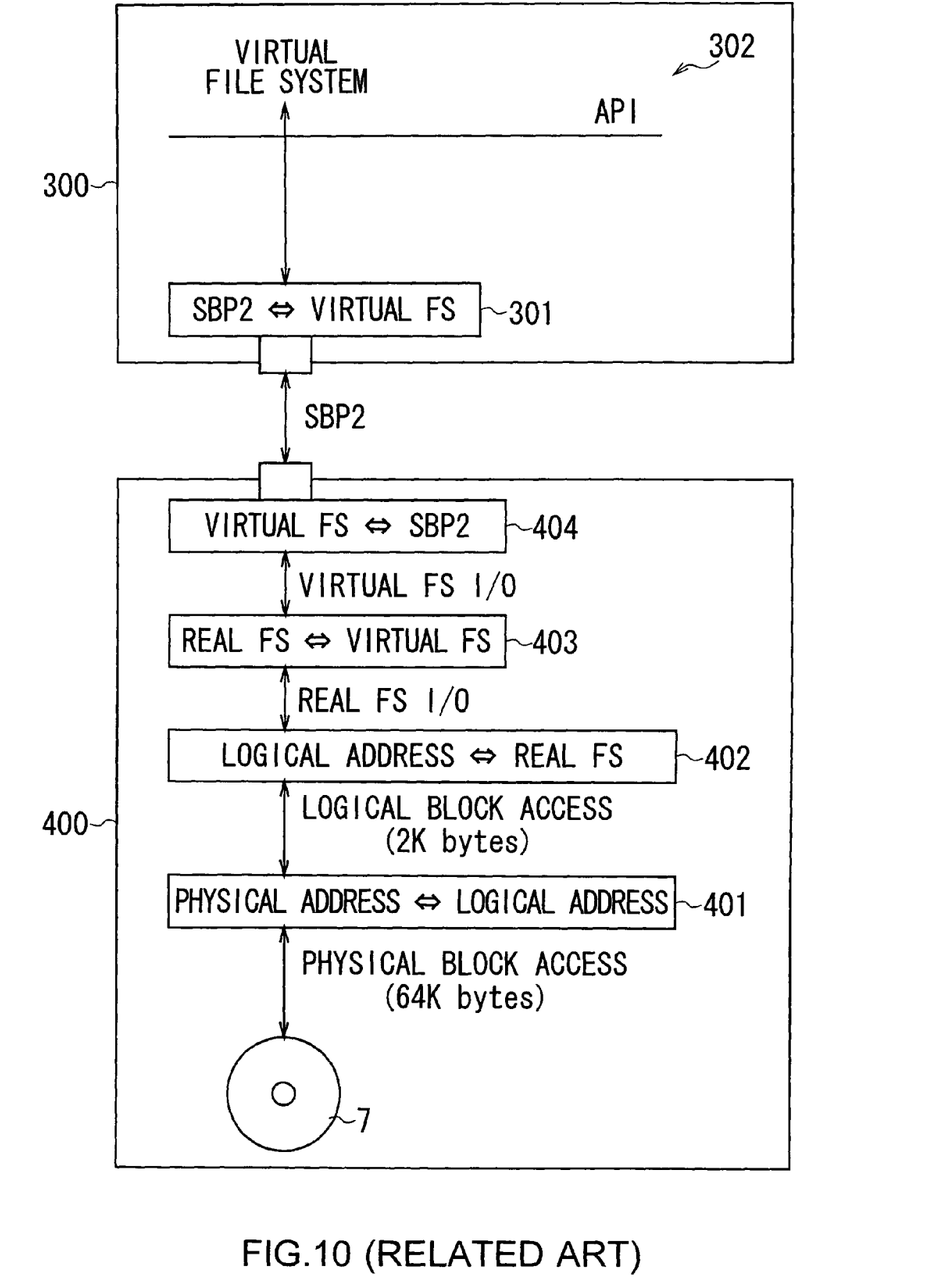
FIG. 10 is a schematic illustration of the basic concept of the related art.

FIG. 10 illustrates the basic concept of this technique.

Referring to FIG. 10, the host is typically a personal computer (PC) 300 and the device is an optical disc drive 400. The optical disc drive 400 is a device for recording information on and reproducing information from an optical disc 7.

The optical disc drive 400 is equipped with a logical/physical address conversion feature 401 for performing logical/physical address conversion in order to access the physical block as recording/reproduction access to the optical disc 7.

The optical disc drive 400 is also equipped with a real file system providing feature 402 for providing a real file system and realizing a logical block access according to the real file system built on the optical disc 7 (in FIG. 10, "FS" represents a "file system").

Still additionally, the optical disc drive 400 is equipped with a virtual file system providing feature 403 for converting the real file system into a virtual file system.

Furthermore, the optical disc drive 400 is equipped with a host input/output (I/O) providing feature 404 for providing a virtual file system by means of a SBP-2 command.

On the other hand, the personal computer 300 is equipped with a device I/O providing feature 301 for realizing an access based on a virtual file system by means of a SBP-2 command.

With the above-described feature arrangement, the application of the personal computer 300 can handle data on the optical disc 7 by means of the virtual file system.

In other words, the real file system on the disc 7 is converted into a virtual file system by the optical disc drive 400 and provided to the personal computer 300 and the application can access the optical disc 7 by means of the virtual file system as the virtual file system is provided to the application program interface (API) 302 at the personal computer 300.

SUMMARY OF THE INVENTION

As described above, with the technique described in the above-cited U.S. Patent Publication, an optical disc drive 400 provides a virtual file system that the user can handle with ease. However, as shown in FIG. 10 as virtual file system providing feature 403, the optical disc drive 400 is required to have complex processing features for analyzing file systems such as those in the universal disc format (UDF) and realizing virtual file systems. Additionally, a high-speed operation apparatus and a large capacity memory are required in order to provide such processing features with an enhanced level of performance.

Then, the cost and the scale of the optical disc drive 400 are inevitably raised.

Additionally, it is difficult to provide a virtual file system when it is not possible to mount such processing features in the optical disc drive due to limitations in terms of cost and size. Then, from the host point of view, such an optical disc drive is merely a direct access drive. If such is the case, the virtual file system appears to the application as a real file system where images and sounds are separately filed exactly as the above-cited U.S. Patent Publication describes.

In view of the above-identified circumstances, it is desirable to allow the user to enjoy the advantages of a virtual file system without forcing the media drive such as the optical disc drive 400 to be loaded with processing features.

In an aspect of the present invention, there is provided an information processing apparatus adapted to be connected for use to a media drive apparatus for recording data on or reproducing data from a recording medium having a file system, the apparatus including: a real file system acquiring section that acquires the file system of the recording medium from the media drive apparatus; and a virtual file system providing section that converts the file system acquired by the file system acquiring section into a virtual file system having a directory/file structure different from the directory/file structure on the recording medium and provides it to an application program.

The real file system acquiring section is realized by a file system driver and the virtual file system providing section is realized by middleware.

Alternatively, the real file system acquiring section is realized by a file system driver and the virtual file system providing section is realized by a file system filter driver.

Still alternatively, the real file system acquiring section and the virtual file system providing section are realized by a file system driver.

Still alternatively, the real file system acquiring section and the virtual file system providing section are realized by middleware.

In another aspect of the present invention, there is provided an information processing method of an information processing apparatus adapted to be connected for use to a media drive apparatus for recording data on or reproducing data from a recording medium having a file system, the method including: a step of acquiring the file system of the recording medium from the media drive apparatus; a step of converting the acquired file system into a virtual file system having a directory/file structure different from the directory/file structure on the recording medium; and a step of providing the converted virtual file system to an application program.

In still another aspect of the present invention, there is provided a program for causing an information processing apparatus to execute the real file system acquiring step and the virtual file system providing step.

In still another aspect of the present invention, there is provided a program recording medium where the above-described program is recorded.

Thus, according to the aspects of the present invention, a media drive apparatus such as an optical disc drive provides a real file system to an information processing apparatus as the file system of a recording medium such as an optical disc in an ordinary manner. The information processing apparatus can convert the real file system acquired from the media drive apparatus into a virtual file system and utilize the virtual file system for applications.

In other words, according to the aspects of the present invention, an emulator is realized in an information processing apparatus for virtual file systems.

Thus, according to the present invention, it is possible for an application to utilize a virtual file system when accessing a recording medium having a file system for the purpose of recording or reproduction without imposing a process load on the media drive apparatus connected to an information processing apparatus. Then, as a result, it is possible for the application to handle the recording medium with ease.

Additionally, the present invention provides the above-described advantages to an information processing apparatus connected to (or mounted with) a conventional media drive apparatus because the media drive apparatus is not required to execute any special process.

Thus, a program and a program recording medium according to the embodiment of the present invention can realize an information processing apparatus and an information processing method that provide the above-described advantages.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, an embodiment of the present invention will be described in greater detail in the following order by referring to the accompanying drawings.
(1) Summary of the System of the Embodiment
(2) An Example of System Configuration
(3) The Real File System and the Virtual File System
(4) Examples of Installation
(1) Summary of the System of the Embodiment FIG. 1 is a schematic illustration of a basic model of the embodiment and the basic concept thereof.

Figure 1:
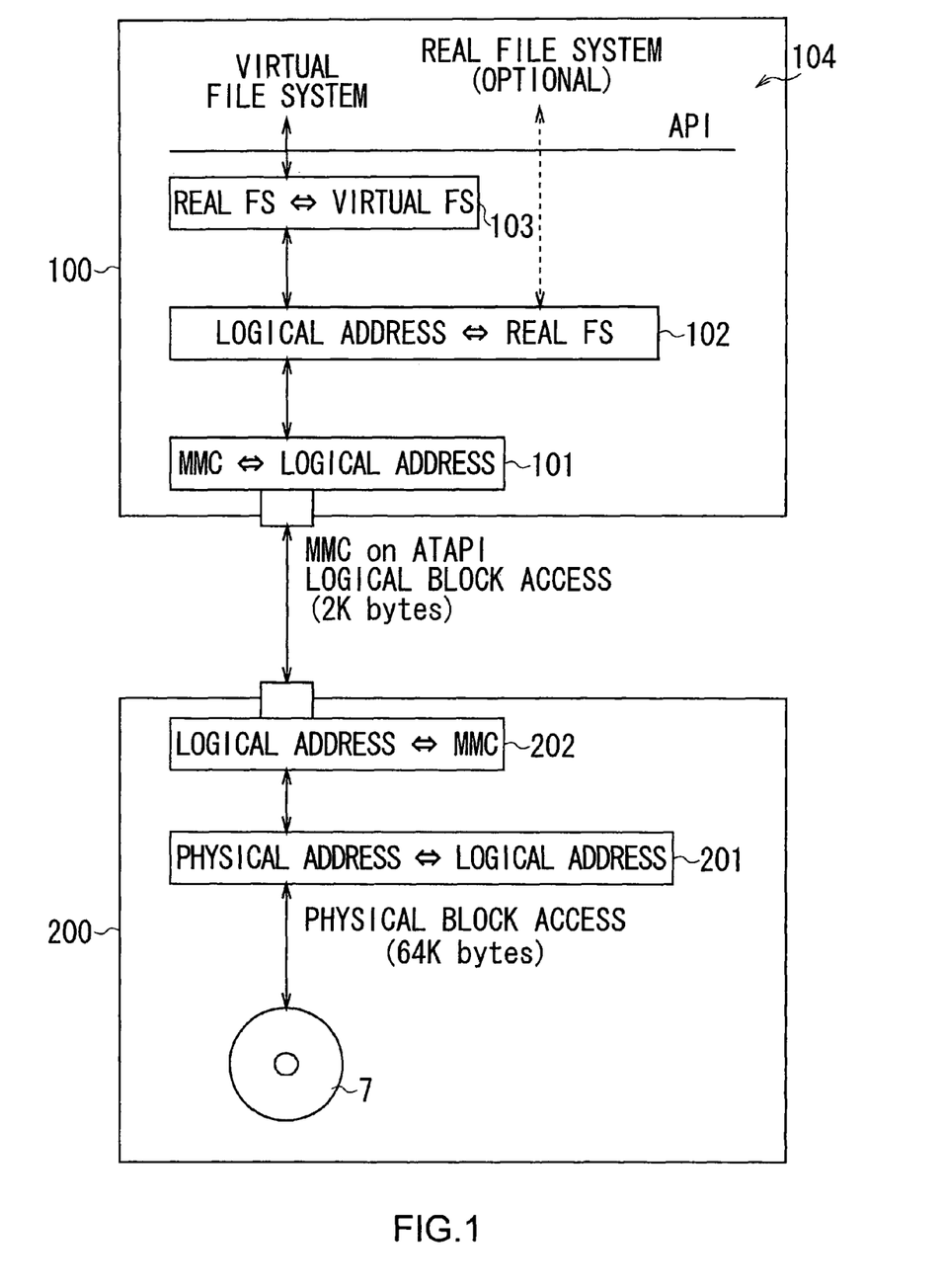
FIG. 1 is a schematic illustration of the basic concept according to an embodiment of the present invention.

FIG. 1 shows a host 100 and a device 200. The device 200 is a media drive apparatus such as an optical disc drive. The device 200 operates as a simple direct access device and provides an I/O to the logic sector of an optical disc 7, for example.

Thus, the device 200 includes a logic/physical address conversion module 201 for performing physical address/logical address conversion in order to gain a physical block access when recording on or reproducing from the optical disc 7 and a host I/O providing module 202 for transmission/reception by way of a multimedia command set (MMC) for an access by the host 100 by way of a logical address. The logical block access from the host 100 by way of the MMC is made typically by means of an attachment packet interface (ATAPI).

For such a device 200, the host 100, which corresponds to the embodiment of information processing apparatus, can realize an emulator of the virtual file system as a device I/O providing module 101, a real file system providing module 102 and a virtual file system providing module 103 are arranged in it.

The device I/O providing module 101 operates as a so-called storage device driver for converting the read/write command to be accessed by a higher order device by specifying the logical address typically into as small computer system interface (SCSI) command and issues it to the device 200 by way of the ATAPI.

The real file system providing module 102 provides a real file system for having a logical block access according to the real file system built on the optical disc 7.

The virtual file system providing module 103 converts a real file system into a virtual file system.

Thus, the host 100 acquires the real file system on the disc 7 from the device 200 and subsequently converts the real file system into a virtual file system by means of the virtual file system providing module 103. Then, as the virtual file system is provided to application program interface (API) 104, an application can access the optical disc 7 mounted in the device 200 that operates as a direct access device by means of the virtual file system.

Note that the real file system providing module 102 can optionally provide the real file system to the API 104.

As will be described hereinafter, each of the real file system providing module 102 and the virtual file system providing module 103 is realized by a file system driver, middleware or a file system filter driver.
-File System Driver (FSD)

A file system driver provides a file input/output interface that is standard for the system to an application in the form of a software component incorporated into the operating system (OS) that is executed in a processor access mode of kernel mode.
-Middleware Middleware generally refers to a software component that is executed in a processor access mode of user mode. This includes a run time library that provides a unique file input/output interface, a shell expansion module that provides file input/output at a shell interface and service/daemon that can provide file input/output interface that is standard for the system by combining a file system redirector and so on.

-File System Filter Driver

A file system filter driver is a software component that is executed in a processor access mode of kernel mode but can intercept a file input/output request to the target file system driver and can expand its function.

(2) An Example of System Configuration

Figure 2:
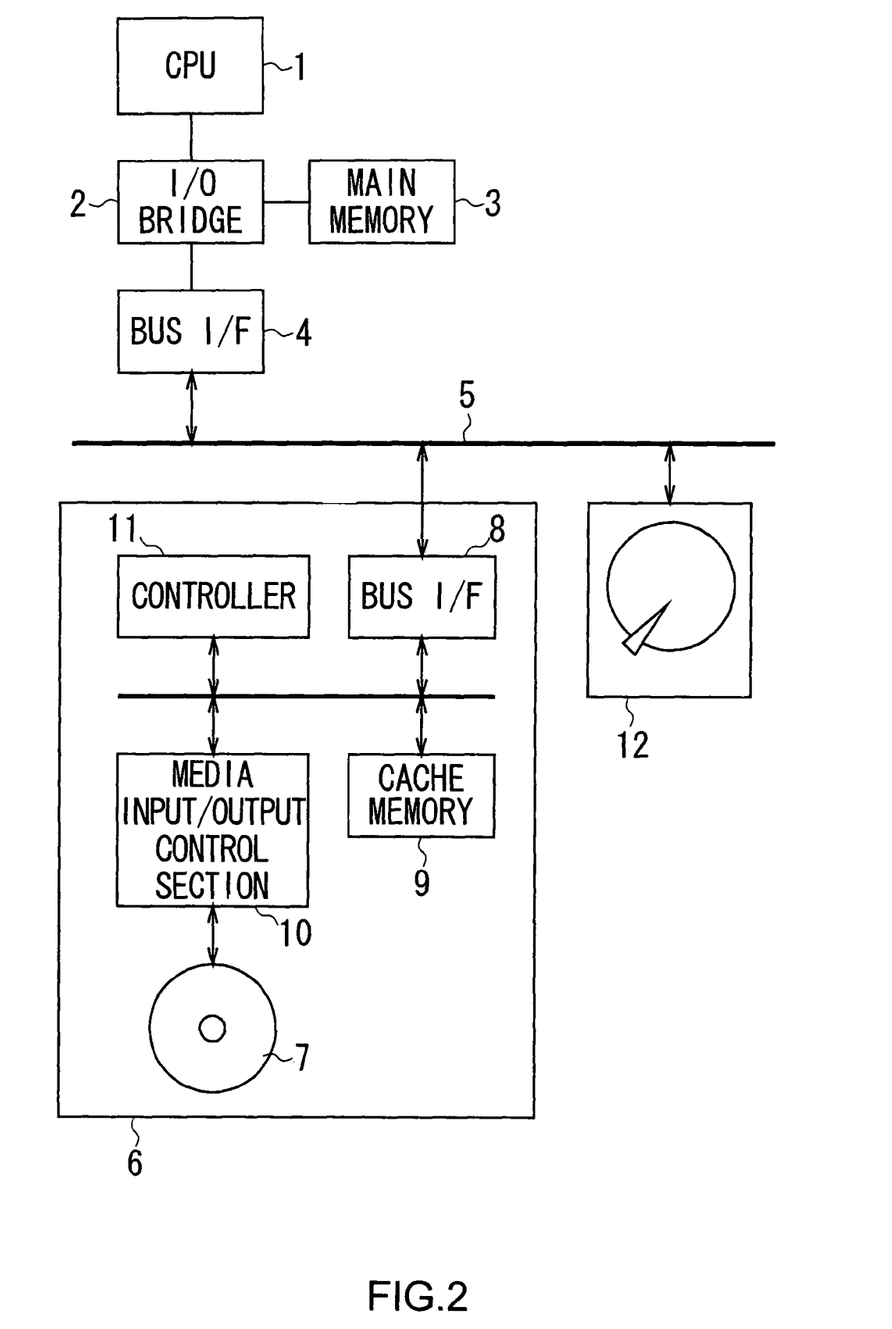
FIG. 2 is a schematic block diagram of the information processing system according to the embodiment of the present invention.

FIG. 2 is a schematic block diagram of the information processing system according to the embodiment of the present invention, showing an exemplar configuration thereof. While the information processing system can be realized as a computing system, it can find a broad scope of application in the field of audio/visual (AV) systems and media recording/reproduction systems.

The information processing system of FIG. 2 includes a central processing unit (CPU) 1, an I/O bridge 2, a main memory 3, a bus interface 4, an ATA bus 5, an optical disc drive 6 and a hard disc drive 12.

The optical disc drive 6 is a device for recording/reproduction on an optical disc 7 and includes a bus interface 8, a cache memory 9, a media input/output control section 10 and a controller 11.

The optical disc drive 6 is a drive that can record or reproduce AV data at a high bit rate on a real time basis.

The optical disc drive 6 may be contained in the housing of the computer that operates as the information processing system or connected to the computer by way of a predetermined interface cable so as to operate as a stand-alone device.

The media input/output control section 10 has an optical pickup, a spindle mechanism, a servo mechanism, an encoder, a decoder and so on and operates to actually record data on and reproduce data from the optical disc 7.

The controller 11 has a function of operating as a logical/physical address conversion module 201 and a host I/O providing module 202 as shown in FIG. 1 and controls the recording operation and the reproduction operation of the media input/output control section 10 according to the command from the CPU 1 of the host.

The cache memory 9 operates as cache-storage for the data read out from the optical disc 7.

The bus interface 8 operates for transmission/reception of data and commands relative to the CPU 1 of the host by way of the ATA bus 5.

While the optical disc drive 6 is described above as an example of the device 200 in FIG. 1, the type of optical disc 7 is not particularly limited. In other words, the optical disc drive 6 can be realized as a recording/reproduction apparatus that can accommodate various optical discs 7. Media that can be used for the purpose of the present invention include magnetic discs, magneto-optical discs, memory cards containing a flash memory and hologram media in addition to optical discs. Thus, it is sufficient for the recording/reproduction apparatus to be adapted to the media to be used with it. The device 200 may be an apparatus dedicated to reproduction or recording of data.

The CPU 1 executes various processes as an operating system (OS) or an application (program) is started and the application is executed under the control of the OS.

The CPU 1 is connected to the main memory 3 by way of the I/O bridge 2. The main memory 3 is a non-volatile memory including a read only memory (ROM), a random access memory (RAM) or a flash memory and has a memory region that is used by the CPU 1.

The CPU 1 also transmits commands and data to and receives commands and data from the optical disc drive 6 and the hard disc drive (HDD) 12 connected to the ATA bus 5 by way of the bus interface 4.

For example, the CPU 1 executes a program stored in the ROM of the main memory 3 in response to a corresponding input of the user from the keyboard, the mouse or the microphone connected to the CPU by way of an input/output interface (not shown).

The CPU 1 also loads the RAM of the main memory 3 with a program stored in the HDD 12, a program transferred from a satellite or a network, received by a communication section 18 (not shown) and installed in the HDD 12 or a program read out from the removable recording medium such as an optical disc 7 mounted in the optical disc drive 6 and installed in the HDD 12 and executes it.

Then, if necessary, the CPU 1 causes an output section typically including a liquid crystal display (LCD) and a speaker to output the results of the execution process of the program, the communication section to transmit them, the HDD 12 to record them and/or the optical disc drive 6 to record them on an optical disc 7.

While the CPU 1 executes programs of the OS and various applications, the specific programs that operate as the real file system providing module 102 and the virtual file system providing module 103 shown in FIG. 1 are contained in the OS.

Then, the programs of the OS and various applications can be recorded in advance in the HDD 12 that is a recording medium contained in the system or the ROM of the main memory 3.

Alternatively, the programs can be temporarily or permanently stored (recorded) in a removable recording medium such as a flexible disc, a compact disc read only memory (CD-ROM), a magneto-optical (MO) disc, a digital versatile disc (DVD), a magnetic disc or semiconductor memory. Such a removable recording medium can be provided as so-called package software.

Instead of installing the programs into the information processing system of this embodiment from a removable recording medium as described above, the programs can still alternatively be transferred from a downloading site to the information processing system of this embodiment wirelessly by way of an artificial satellite for digital satellite broadcasting or by wired transfer by way of a network such as a local area network (LAN) or the Internet and received by the information processing system, which then install them in the HDD 12 it contains.

Assume now that the OS and the application (programs) are installed at least in the HDD 12. Then, as the power source of the information processing system is turned on, the CPU 1 loads the RAM of the main memory 3 with the OS from the HDD 12 and executes it. Additionally, as an application program is requested to start as a result of an input operation on the part of the user, the CPU 1 loads the RAM with the application from the HDD 12 and executes it under the control of the OS.

As the application makes an access request that is a request relating to an operation on a file given to the optical disc 7 mounted in the optical disc drive 6, the OS executes the access request. Then, as a result, the data requested to be recorded by the access request from the application is actually recorded on the optical disc 7 or the data requested to be reproduced (read out) by the access request from the application is actually read out from the optical disc 7 and delivered to the application that made the request by way of the OS.

While any of various applications may be installed in the HDD 12 and executed by the CPU 1, conceivable typical applications that employ the optical disc drive 6 include AV applications for taking in AV data and editing/recording/reproducing AV data. However, such applications may include those that edit text data and those that display files (e.g., file utilities such as "explorers" and "file managers").

The OS may be Unix™, Linux™, Windows™ marketed by Microsoft, or some other appropriate OS.

(3) The Real File System and the Virtual File System ]

Now, the real file system and the virtual file system will be described below.

A real file system is a system for managing real files (actual files) on an optical disc 7 typically according to UDF. It controls the operator of writing data to or reading data from the optical disc 7 on a logical block by logical block basis. Additionally, a real file system has a file allocation manager for efficiently controlling file recording operations, managing the operation of allocating files on the optical disc 7, processing defects and also managing free regions.

The virtual file system converts the real file system in order to put it into a file management format that can suitably be used by an application by coordinating the files of the real file system and executing processes such as filtering processes.

As an example, the real file system of an optical disc 7 where AV data are recorded in a video data file and an audio data file that are separate files may be put into a single file for easy management.

Figure 3:
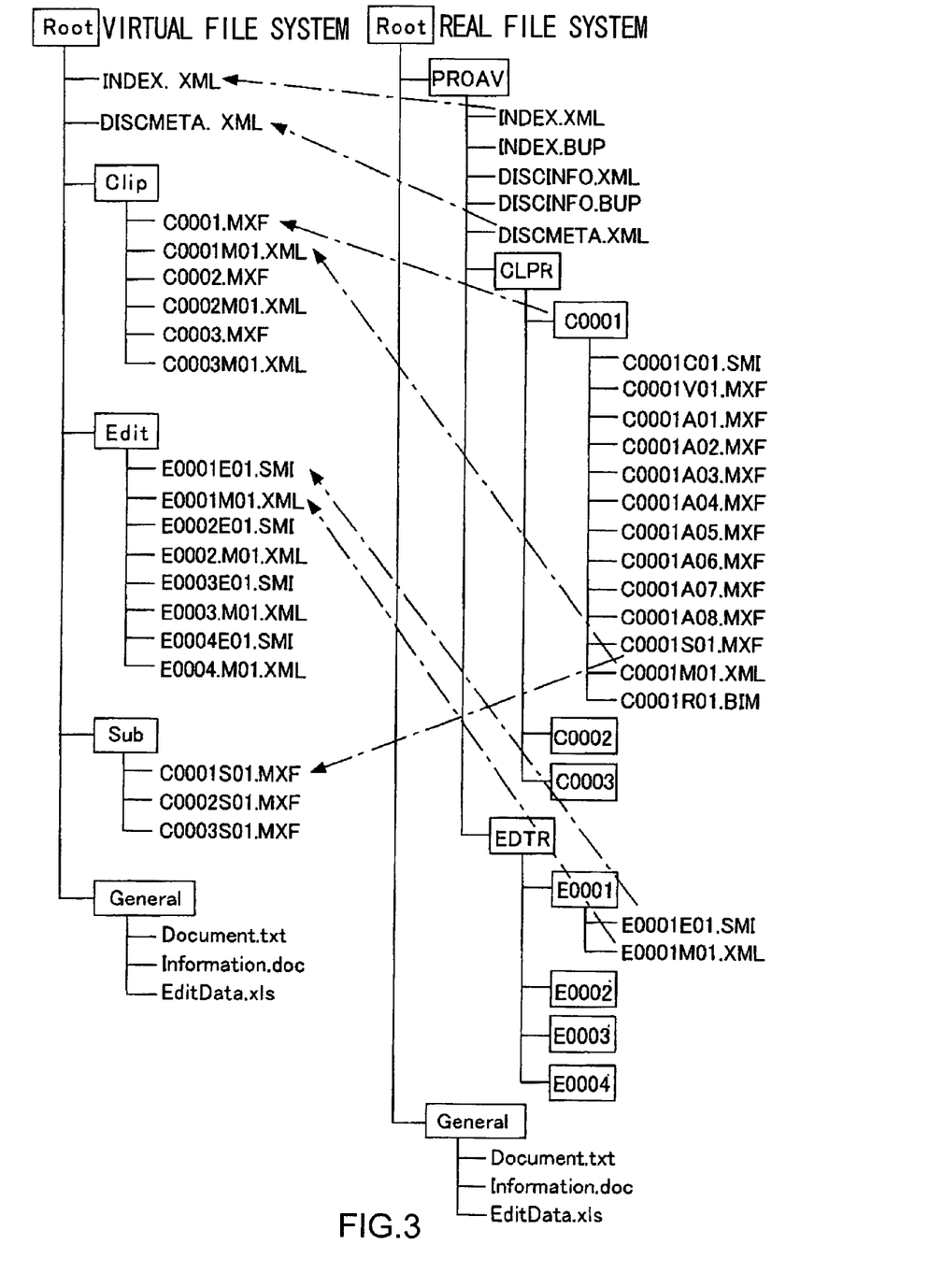
FIG. 3 is a schematic illustration of a real file system and a virtual file system that can be sued in the embodiment.

FIG. 3 is a schematic illustration of a real file system and a virtual file system that can be used in the embodiment.

In FIG. 3, the right side shows real files managed by the real file system, whereas the left side shows virtual files managed by the virtual file system.

Firstly, the real files of the real file system on the right side in FIG. 3 will be described.

In the following description, the alphanumeric letters annexed to "directory" show the directory name of the directory. Similarly, the alphanumeric letters annexed to "file" show the file name of the file. Of a file name, the alphabetic letters annexed to a period (.) is the extension of the file. For example, extension "XML" indicates an XML (eXtensible Markup Language) file and extension "MXF" indicates an MXF (material Exchange Format) file.

A root directory ROOT includes a directory that stores information on material data such as video data and audio data and an edit list showing the results editing material data, a directory PROAV where files (directories) relating to other AV data are allocated and a general directory General that stores files of data other than files relating to AV data such as file Document.txt, Information.doc, EditData.xls.

Let us pick up an MXF file as a file relating to AV data here. Assume that the MXL file that is a real file managed by the real file system is a file of MXL OP-Atom with which separate files are provided for video data and audio data, whereas the virtual file managed by the virtual file system and provided to the outside is a file of MXF OP-1a with which a single file is provided for video data and audio data as a result of interleaving.

Index files INDEX.XML and INDEX.BUP, disc information files DISKINFO.XML and DISCINFO.BUP and a disc metafile DISCMETA.XML are arranged in directory PROAV.

The index files INDEX.XML and INDEX.BUP contain management information for managing all the clips and the edit list recorded on the optical disc 7.

A clip is a set of an entity of video data such as the video data recorded on the optical disc 7 in a single recording operation and the audio data that correspond to the video data.

An edit list is a list showing the editing sequence of a so-called non-linear editing operation. For example, when the AV data of a file is cut and edited by non-linear editing, the file name that is the information for identifying the file and information on in points and out points is recorded in the edit list.

The index file INDEX.BUP is a back up file of the index file INDEX.XML.

The disc information files DISCINFO.XML and DISKINFO.BUP are files containing metadata relating to the entire data recorded on the optical disc 7. For example, they are files containing information on the attributes of the optical disc 7 and the reproduction starting positions.

The disc information file DISKINFO.BUP is a back up file (copy) of the disc information file DISCINF.XML.

The discmetafile DISCMETA.XML is a file containing information such as the titles and the comments relative to all the material data recorded on the optical disc 7 and the passes of the video data corresponding to a representative image, or a frame, representing all the video data recorded on the optical disc 7.

In addition to the above-described files, clip root directory CLPR where data of clips are arranged in a lower order directory and edit list root directory EDTR where data of an edit list are arranged in a lower order directory are also arranged in the directory PROAV.

The data on the clips recorded on the optical disc 7 are divided on a clip by clip basis and managed by respective directories in the clip root directory CLPR. For example, the three clip data at the right side of FIG. 3 are divided for and managed by three clip directories C0001, C0002 and C0003.

More specifically, the data of the clip #1 recorded first on the optical disc 7 are managed as the files of the clip directory C0001 and the data of the clip #2 recorded second on the optical disc 7 are managed as the files of the clip directory C0002, while the data of the clip #3 recorded third on the optical disc 7 are managed as the files of the clip directory C0003.

In the clip directory C0001, the files of data of the clip #1 recorded first on the optical disc 7 are allocated.

Referring to the right side of FIG. 3, clip information file C0001C01.SMI that is a file for managing the clip #1, video data file C0001V01.MXF that is a file containing the video data of the clip #1, eight audio data files C0001A01.MXF through C0001A08.MXF that are respective files containing the audio data of the eight channels of the clip #1, a low resolution data file C0001S01.MXF that is a file containing the video data of the low bit rate of the clip #1, a clip metadata file C0001M01.MXL that is a file containing the clip metadata that are not required to be handled on a real time basis such as conversion table establishing correspondence between longitudinal time codes (LTCs) and frame numbers and corresponding to the material data of the clip #1 and a frame metadata file C0001R01.BLM that is a file containing the frame metadata that are required to be handled on a real time basis such as LTC corresponding to the material data of the clip #1 are arranged in the clip directory C0001.

Files similar to those of the flip directory C0001 are arranged in each of the other clip directories C0002 and C0003 for the respective clips #2 and #3 at the right side of FIG. 3.

The edit lists recorded on the optical disc 7 are separated by respective directories that are differentiated for editing processes and managed in the edit list route directory EDTR under the directory PROAV. In the instance of FIG. 3, four edit lists are separated by four respective edit list directories E0001, E0002, E0003 and E0004 and managed.

Thus, the edit list #1 that shows the results of the first editing process of the clips recorded on the optical disc 7 is managed as a file of the edit list directory E0001 and the edit list #2 that shows the results of the second editing process of the clips recorded on the optical disc 7 is managed as a file of the edit list directory E0002, while the edit list #3 that shows the results of the third editing process of the clips recorded on the optical disc 7 is managed as a file of the edit list directory E0003 and the edit list #4 that shows the results of the fourth editing process of the clips recorded on the optical disc 7 is managed as a file of the edit list directory E0004.

Referring again to the right side of FIG. 3, edit list file E0001E01.SMI that is a file of the edit list #1 and edit list clip metadata file E0001.M01.XML that is a file of the clip metadata corresponding to the post-editing material data obtained after an editing process executed according to the edit list #1 (the part extracted as post-editing data out of the material data of all the clips used for the editing process) or the clip metadata newly generated according to the clip metadata are arranged under the edit list directory E0001.

The edit list clip metadata file E0001.M01.XML is a file containing new clip metadata generated according to the clip metadata (the clip metadata file found in a lower order directory relative to the clip root directory CLPR (e.g., clip metadata file C0001M01.XML of the directory C0001 at the right side of FIG. 3)) used for editing.

For example, as an editing process is executed on the clip #1, the part of the clip metadata contained in the clip metadata file C0001.M01.XML and corresponding to the post-editing material data is extracted from the clip metadata and new clip metadata are rearranged for the post-editing material data that are handled as a clip and managed as edit list clip metadata file. In other words, new clip metadata for the post-editing material data that are handled as a clip are added to the post-editing material data and the clip metadata are managed as a edit list clip metadata file. Thus, an edit list clip metadata file is generated after each editing process.

Files similar to those of the edit list directory E0001 are arranged under each of the other edit list directories E0002 through E0004 shown at the right side of FIG. 3 respectively for the edit lists #2 through #4.

The real files that are managed by the real file system shown at the right side of FIG. 3 are provided by the real file system providing module 102 of FIG. 1. The real file system is converted into a virtual file system shown at the left side of FIG. 3 and provided to the application depending on the virtual file system providing module 103.

More specifically, index file INDEX.XML and disc metafile DISCMETA.XML are arranged along with directories Clip, Edit, Sub and General under the root directory ROOT of the virtual file system.

The index file INDEX.XML and the disc metafile DISCMETA.XML arranged under root directory ROOT of the virtual file system are respectively the index file INDEX.XML and the disc metafile DISCMETA.XML of the directory PROAV managed by the real file system.

The files of the data of the clips arranged in the lower order directories of the directory CLPR that is managed by the real file system are arranged under the directory Clip of the virtual file system.

More specifically, files C0001.MXF, C0002.MXF and C0003.MXF are arranged under the directory Clip as files of the data of the clips respectively found in the directories C0001, C0002 and C0003 shown at the right side of FIG. 3.

As pointed out above, the data of a clip are put into file MXF OP-Atom, with which separate files are provided for video data and audio data in the real file system.

More specifically, under the directory C0001 (and also under the directories C0002 and C0003) at the right side of FIG. 3, the data of the clip #1 are divided and put into video data file C0001V01.MXF containing the video data of the clip #1 and audio data files C0001A01.MXF through C0001A08.MXF containing the audio data of the eight channels of the clip #1.

On the other hand, in the virtual file system, both the video data and the audio data of a clip are interleaved and put into a single file. Thus, both the video data and the audio data of the clip #1 are put into the above-described file MXF OP-1a.

Thus, the file C0001.MXF arranged under the directory Clip at the left side of FIG. 3 is a file where the video data and the audio data of the clip #1 of the directory C0001 at the right side of FIG. 3 are interleaved and put together.

Thus, the file C0001.MXF is a file where the video data of the video data file C0001V01.MXF and the audio data of the eight channels of the audio data files C0001A01.MXF through C0001A08.MXF of the directory C0001 are interleaved and put together.

Similarly, the file C0002.MXF under the directory Clip is a file where the video data and the audio data of clip #2 of the directory C0002 are interleaved and put together and the file C0003.MXF under the directory Clip is a file where the video data and the audio data of clip #3 of the directory C0003 are interleaved and put together.

The clip metadata files of the clips are also arranged under the directory Clip at the left side of FIG. 3.

In the illustrated instance, clip metadata files C0001M01.XML, C0002M01.XML and C0003M01.XML are arranged under the directory Clip at the left side of FIG. 3.

The clip metadata file C0001M01.XML under the directory Clip is the clip metadata file of Clip #1 that corresponds to the clip metadata file C0001M01.XML under the directory C0001 at the right side of FIG. 3.

Similarly, the clip metadata file C0002M01.XML under the directory Clip is the clip metadata file of Clip #2 that corresponds to the clip metadata file under the directory C0002 at the right side of FIG. 3. Likewise, the clip metadata file C0003M01.XML under the directory Clip is the clip metadata file of Clip #3 that corresponds to the clip metadata file under the directory C0003 at the right side of FIG. 3.

The files in the lower order directories of the directory EDTR at the right side of FIG. 3 are arranged in the directory Edit under the root directory ROOT at the left side of FIG. 3.

In the illustrated instance, files E0001E01.SMI and E0001M01.XML, files E0002E01.SMI and E0002M01.XML, files E0003E01.SMI and E0003M01.XML and files E0004E01.SMI and E0004M01.XML are arranged under the directory Edit at the left side of FIG. 3.

The files E0001E01.SMI and E0001M01.XML under the directory Edit at the left side of FIG. 3 correspond respectively to the files E0001E01.SMI and E0001M01.XML under the directory E0001 of the edit list #1 at the right side of FIG. 3.

Similarly, the files E0002E01.SMI and E0002M01.XML under the directory Edit correspond respectively to the files under the directory E0002 of the edit list #2. Likewise, the files E0003E01.SMI and E0003M01.XML under the directory Edit correspond respectively to the files E0002E01.SMI and E0002E01.XML under the directory E0003 of the edit list #3. The files E0004E01.SMI and E0004M01XML under the directory Edit correspond respectively to the files under the directory E0004 of the edit list #4.

The low resolution data files of the clips are arranged under the directory Sub at the left side of FIG. 3.

In the illustrated instance, low resolution data files C0001S01.MXF, C0002S01.MXF and C0003S01.MXF are arranged under the directory Sub at the left side of FIG. 3.

The low resolution data file C0001S01.MXF of the directory Sub is the low resolution data file of the Clip #1 that corresponds to the low resolution data file C0001S01.MXF under the directory C0001 at the right side of FIG. 3.

Similarly, the low resolution data file C0002S01.MXF of the directory Sub is the low resolution data file of the Clip #2 that corresponds to the low resolution data file under the directory C0002 at the right side of FIG. 3. Likewise, the low resolution data file C0003S01.MXF of the directory Sub is the low resolution data file of the Clip #3 that corresponds to the low resolution data file under the directory C0003 at the right side of FIG. 3.

Files Document.txt, Information.doc and EditData.xls arranged under the general directory General at the right side of FIG. 3 are also arranged under the directory General at the left side of FIG. 3.

In this way, the virtual file system provides the video data and the audio data of each clip that are put in separate files and managed in the real file system after putting them into a single file (virtual file).

The video data and the audio data that are managed respectively by way of separate files of MXF OP-Atom in the real file system are interleaved and put into a single file in the virtual file system and provided to the outside as a single file of MXF OP-1a to a great convenience for handling at the side of users and applications.

For example, when the file of MXF OP-Atom where the video data and the audio data are put into separate files in the real file system and provided to the outside and the tries to specify the Clip #1 as object of reproduction and have an application reproduce it, the user is actually required to specify the file C0001V01.MXF of the video data of the clip #1 and the files C0001A01.MXF through C0001A08.MXF of the audio data for eight channels of the clip #1. Then, the application has to open the total of nine files including the file C0001V01.MXF and the files C0001A01.MXF through C0001A08.MXF specified by the user and acquire the file handles of the files in order to read out the video data and audio data.

To the contrary, with the virtual file system, since the video data of the file C0001V01.MXF of the clip #1 and the audio data of the eight channels of the files C0001A01.MXF through C0001A08.MXF of the clip #1 are provided as single file C0001.MSF, the user is only required to specify the single file C0001.MSF as object of reproduction and it is sufficient for the application to acquire the file handle of the file C0001.MXF and read out the data of the file.

Additionally, the virtual file system can filter the files that do not need to be provided to the outside (applications and users) out of the files managed by the real file system to prevent them from being exposed to the outside.

For example, in the instance of the virtual file system of FIG. 3, the back up files INDEX.BUP and DISCINFO.BUP, the disc information file DISCINFO.XML, the clip information file C0001C01.SMI, the frame metadata file C0001R01.BIM and so on are shielded so as not to be exposed to the outside.

Thus, any of the files to be used only in the inside of the optical disc drive 6 can be prevented from being erased or rewritten due to an operation error at the side of the user.

Additionally, the user is prevented from seeing unnecessary files to waste time and energy when he or she is looking for a necessary file simply because they are visible to the user.

(4) EXAMPLES

As described above, it is possible to handle the files recorded on an optical disc 7 by generating a virtual file system from the real file system on the optical disc 7 and providing it to an application.

As described above by referring to FIG. 1, a real file system providing module 102 and a virtual file system providing module 103 are prepared by the OS of the host 100 (CPU 1).

Now, an example of installation of a real file system providing module 102 and a virtual file system providing module 103 will be described below.

Figure 4:
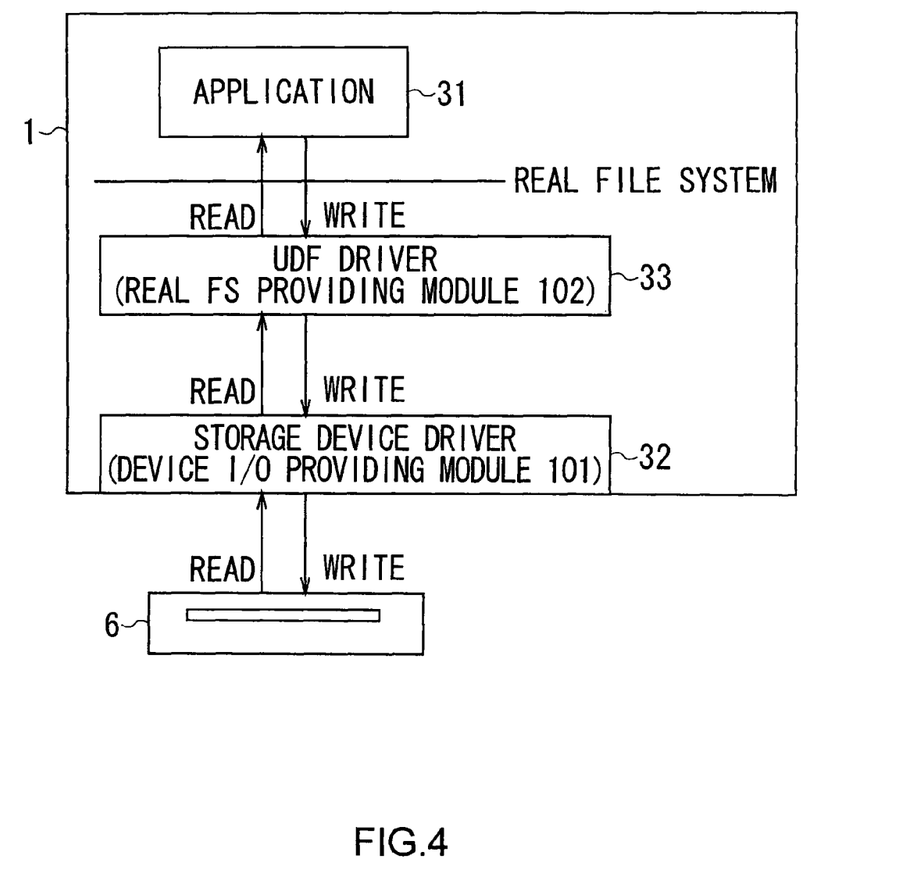
FIG. 4 is a schematic illustration of an OS structure that does not use a virtual file system.

For the purpose of comparison, FIG. 4 shows the module structure that does not have any virtual file system providing module 103. A storage device driver 32 and a UDF driver 33 are arranged in the module 103 and any access (for an access request or data transmission/reception) to the optical disc drive 6 from an application 31 for recording (write)/reproduction (read) is made by way the UDF driver 33 and the storage device driver 32.

The storage device driver 32 operates as device I/O providing module 101 described above by referring to FIG. 1 and the UDF driver 33 operates as real file system providing module 102.

Thus, a real file system is provided to the application 31 and a virtual file system as described above is not provided to the application 31.

FIGS. 5, 6, 7 and 8 illustrate examples of installation of this embodiment.

Figure 5:
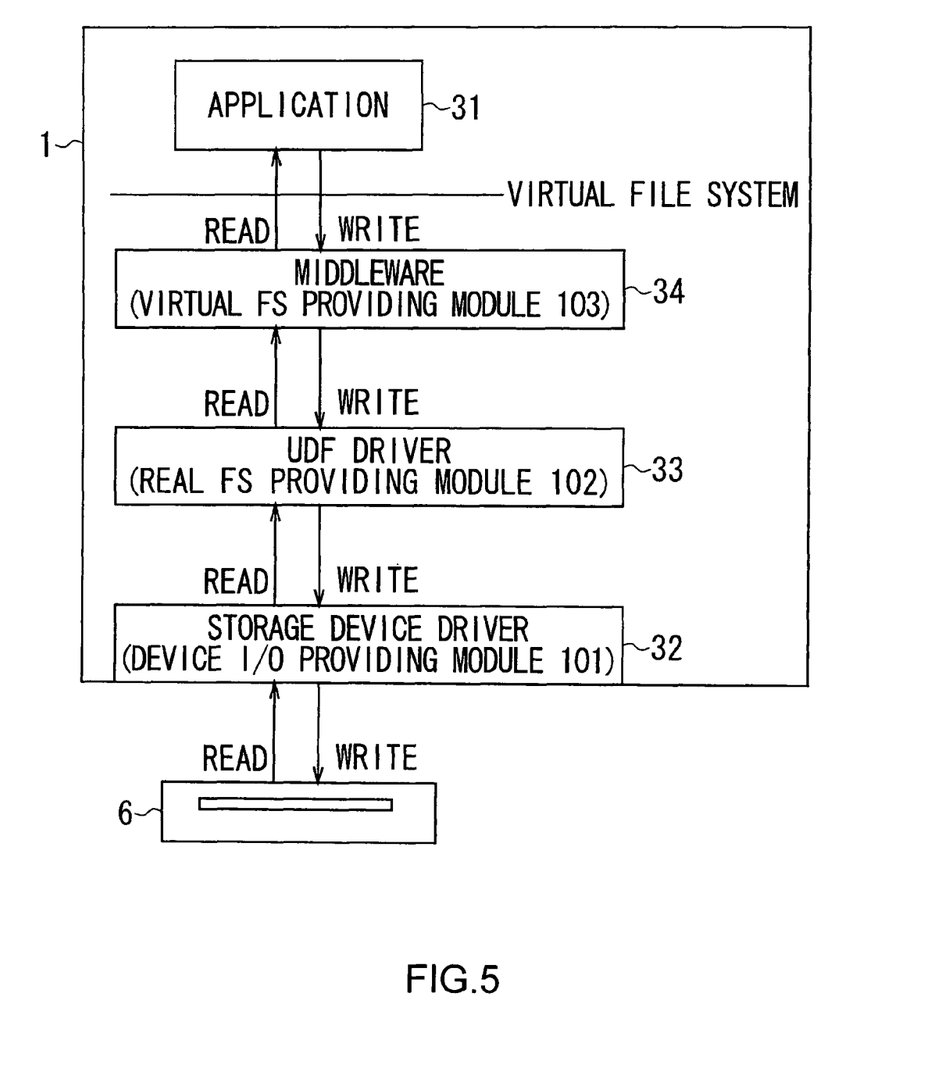
FIG. 5 is a schematic illustration of an installed exemplar module of the embodiment.

FIG. 5 shows an example of installing a real file system providing module 102 and a virtual file system providing module 103 respectively by means of a file system driver and middleware.

Thus, the OS that operates in the CPU 1 is provided with a storage device driver 32, a UDF driver 33 and a middleware 34.

The storage device driver 32 operates as device I/O providing module 101 described above by referring to FIG. 1 and the UDF driver 33 that is a file system driver operates as real file system providing module 102. A virtual file system providing module 103 is installed in the middleware 34.

The access (for an access request or data transmission/reception) at the time of recording (write)/reproduction (read) from the application 31 to the optical disc drive 6 is made by way of the middleware 34, the UDF driver 33 and the storage device driver 32.

At this time, as a virtual file system is provided to the application 31 by means of the virtual file system providing module 103 of the middleware 34, the application 31 can handle the virtual file system on the optical disc 7 as described above.

Figure 6:
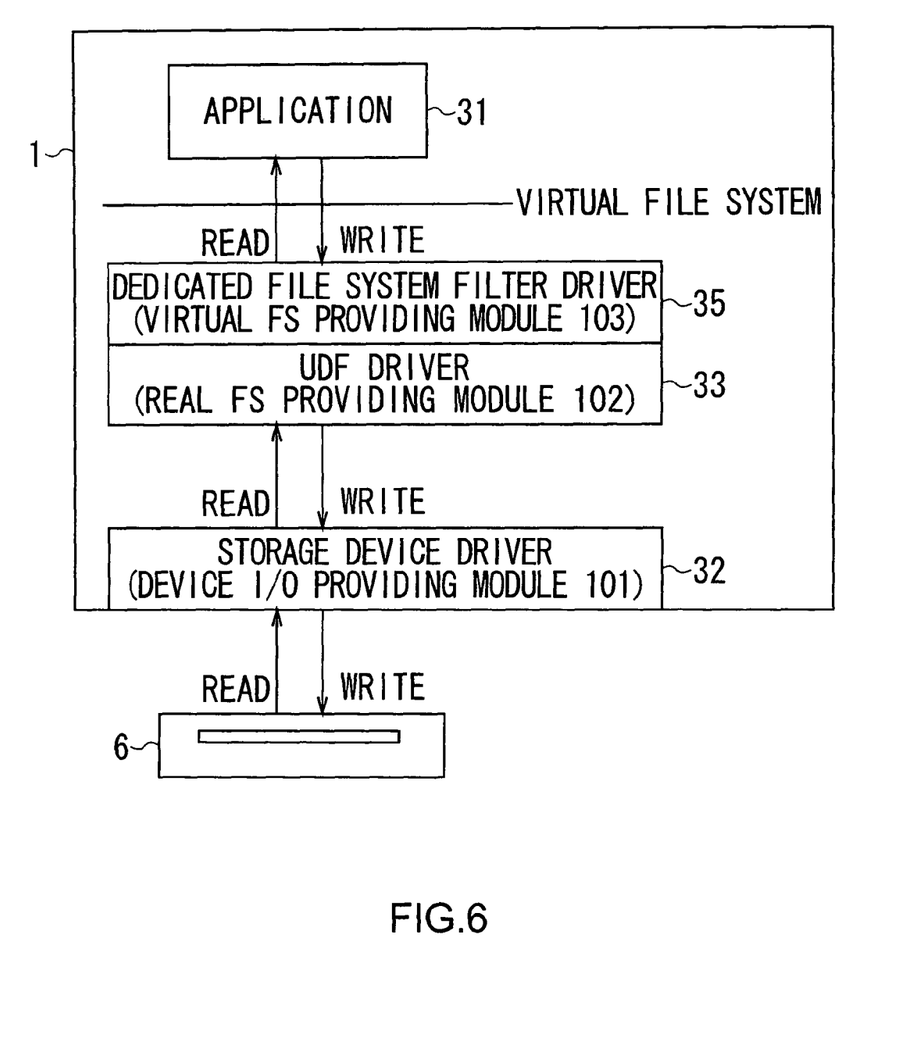
FIG. 6 is a schematic illustration of another installed exemplar module of the embodiment.

FIG. 6 shows an example of installing a real file system providing module 102 and a virtual file system providing module 103 respectively by means of a file system driver and a file system filter driver.

Thus, the OS that operates in the CPU 1 is provided with a storage device driver 32, a UDF driver 33 and a dedicated file system filter driver 35.

The storage device driver 32 operates as device I/O providing module 101 and the UDF driver 33 that is a file system driver operates as real file system providing module 102. In this case, a dedicated file system filter driver 35 that is designed to operate as virtual file system providing module 103 is mounted as a file system filter driver.

The access at the time of recording (write)/reproduction (read) from the application 31 to the optical disc drive 6 is made by way of the dedicated file system filter driver 35, the UDF driver 33 and the storage device driver 32. A virtual file system is provided to the application 31 by the virtual file system providing module 103 installed in the dedicated file system filter driver 35.

Figure 7:
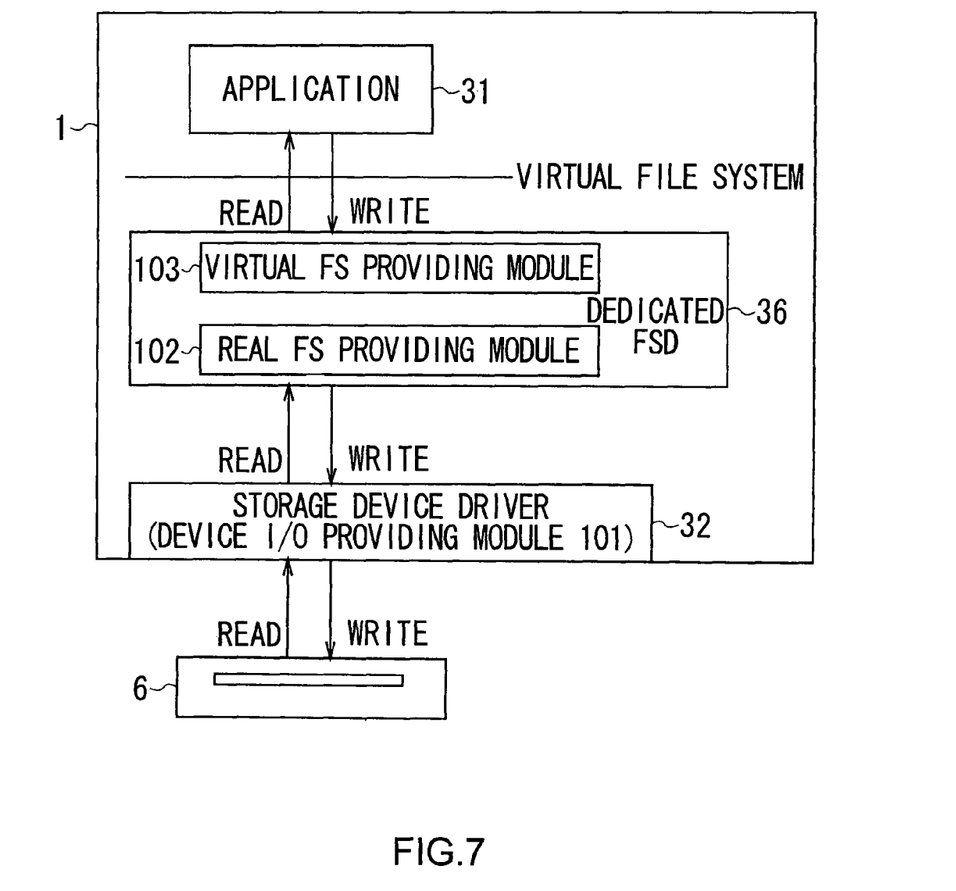
FIG. 7 is a schematic illustration of still another installed exemplar module of the embodiment.

FIG. 7 shows an example of installing a real file system providing module 102 and a virtual file system providing module 103 by means of a file system driver.

Thus, the OS that operates in the CPU 1 is provided with a storage device driver 32 and a dedicated file system driver 36.

The storage device driver 32 operates as device I/O providing module 101. A dedicated file system driver 36 that is designed to install a real file system providing module 102 and a virtual file system providing module 103 is mounted as file system driver.

The access (for an access request or data transmission/reception) at the time of recording (write)/reproduction (read) from the application 31 to the optical disc drive 6 is made by way of the dedicated file system filter driver 36 and the storage device driver 32. A virtual file system is provided to the application 31 by the virtual file system providing module 103 installed in the dedicated file system driver 36.

Figure 8:
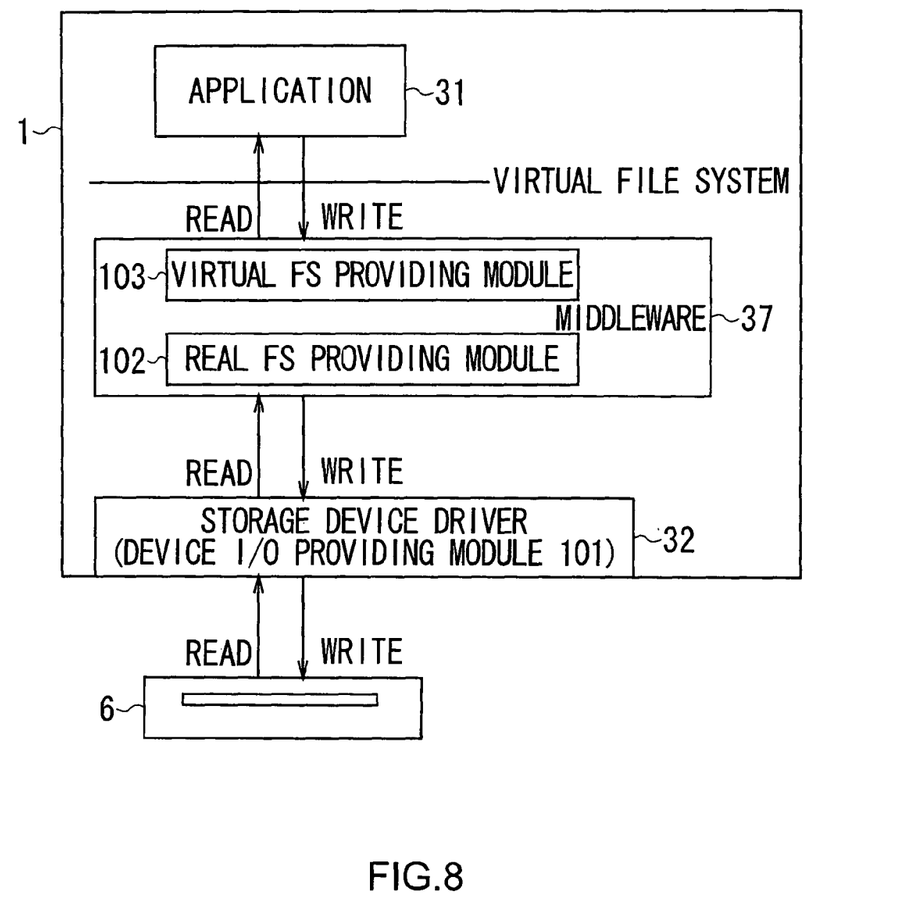
FIG. 8 is a schematic illustration of still another installed exemplar module of the embodiment.

FIG. 8 shows an example of installing a real file system providing module 102 and a virtual file system providing module 103 by means of middleware.

Thus, the OS that operates in the CPU 1 is provided with a storage device driver 32 and middleware 37.

The storage device driver 32 operates as device I/O providing module 101. A real file system providing module 102 and a virtual file system providing module 103 are installed in the middleware 37.

The access (for an access request or data transmission/reception) at the time of recording (write)/reproduction (read) from the application 31 to the optical disc drive 6 is made by way of the middleware 37 and the storage device driver 32. A virtual file system is provided to the application 31 by the virtual file system providing module 103 installed in the middleware 37.

Thus, it is possible to realize an information processing apparatus and an information processing method like those of this embodiment by means of any of the above-described examples. Then, it is possible to make an access by an application 31, utilizing a virtual file system, when an optical disc drive 6 that operates simply as direct access device is employed.

Figure 9A:
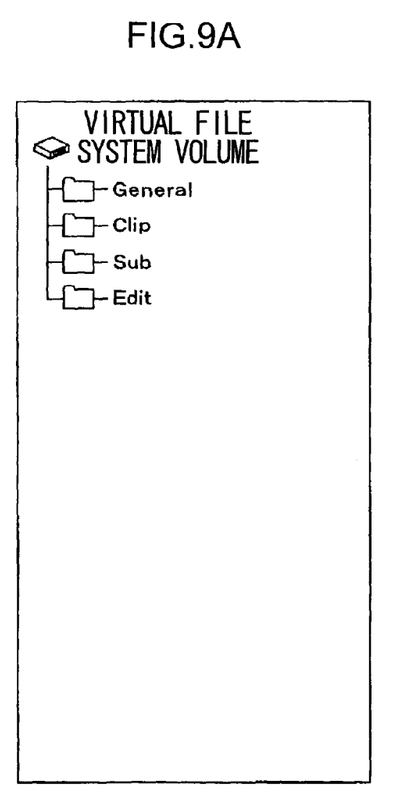
FIGS. 9A through 9C are schematic illustrations of exemplar displays.
Figure 9B:
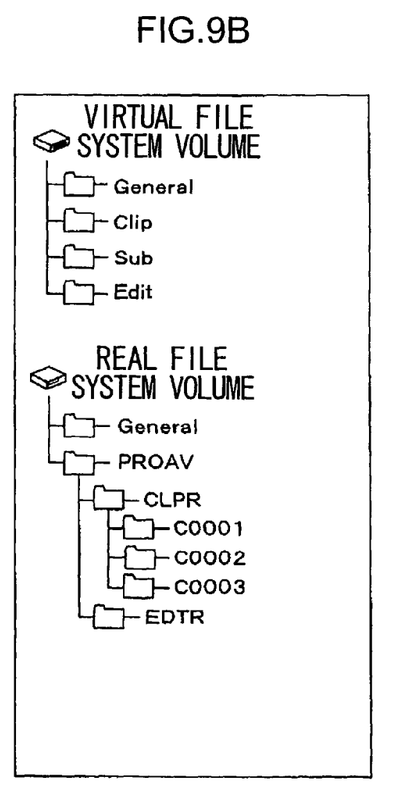
Figure 9C:
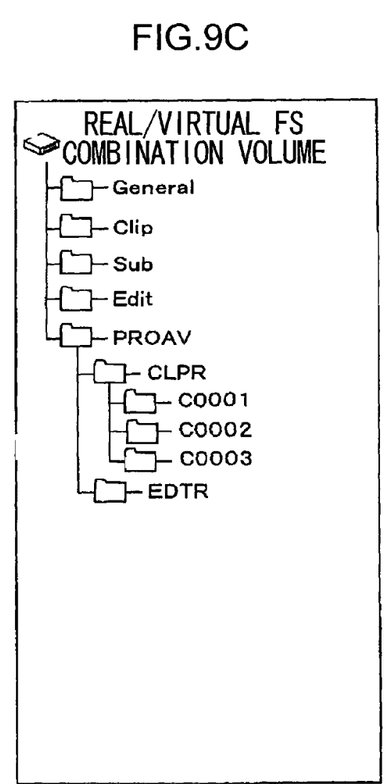

FIGS. 9A through 9C show exemplar displays of the structure of a file system presented to the user by means of a display apparatus such as a liquid crystal display by the application 31. For example, the case of the read file system and the virtual file system of FIG. 3 is taken as an example.

FIG. 9A shows an example of displaying only a virtual file system.

FIG. 9B shows an example of separately displaying a real file system and a virtual file system.

FIG. 9C shows an example of displaying a real file system and a virtual file system in combination.

With any of the exemplar displays, the user can check the virtual file system so that it can suitably be used for a file access using a virtual file system. For instance, a file can be conveniently specified by means of a virtual file system for ordinary AV reproduction.

A display where a real file system is made visible with a virtual file system as shown in FIGS. 9B and 9C can suitably be used in applications where the real file system is preferably employed (as in the case where only audio data are reproduced).

While the present invention is described above by way of an embodiment, an information processing apparatus and an information processing method according to the embodiment of the present invention can find a broad scope of application in the field of various devices including computers such as personal computers, AV apparatus, personal digital assistants (PDAs), portable telephones and navigation apparatus that are adapted to access various recording mediums such as optical discs 7.

A program and a program recording medium according to the embodiment of the present invention can suitably be used for developing, realizing and popularizing an information processing apparatus and an information processing method according to the embodiment of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus adapted to be connected for use to a media drive apparatus for recording data on or reproducing data from a recording medium having a file system, the apparatus comprising:
   a real file system acquiring section that acquires the file system of the recording medium from the media drive apparatus; and
   a virtual file system providing section that, based on interception of a request to the file system acquiring section to acquire the file system, converts the file system acquired by the file system acquiring section into a virtual file system having a directory/file structure different from a directory/file structure of the file system on the recording medium and provides the converted virtual file system to an application program executable by the information processing apparatus to access the recording medium by means of the virtual file system,
   wherein the real file system acquiring section is realized by a file system driver, and the virtual file system providing section is realized by the file system driver or a file system filter driver.

2. The information processing apparatus according to claim 1, wherein
   the application program causes a display apparatus to display the file system and the virtual file system simultaneously.

3. An information processing method of an information processing apparatus adapted to be connected for use to a media drive apparatus for recording data on or reproducing data from a recording medium having a file system, the method comprising:
   a step of acquiring the file system of the recording medium from the media drive apparatus, the step of acquiring being realized by a file system driver;
   a step of, based on interception of a request to acquire the file system, converting the acquired file system into a virtual file system having a directory/file structure different from a directory/file structure of the file system on the recording medium, the step of converting being realized by the file system driver or a file system filter driver; and
   a step of providing the converted virtual file system to an application program executable by the information processing apparatus to access the recording medium by means of the virtual file system.

4. A program recording medium storing a program for causing an information processing apparatus adapted to be connected for use to a media drive apparatus for recording data on or reproducing data from a recording medium having a file system, the program comprising steps of:
   acquiring the file system of the recording medium from the media drive apparatus, the acquiring being realized by a file system driver;
   based on interception of a request to acquire the file system, converting the acquired file system into a virtual file system having a directory/file structure different from a directory/file structure of the file system on the recording medium, the step of converting being realized by the file system driver or a file system filter driver; and
   providing the converted virtual file system to an application program executable by the information processing apparatus to access the recording medium by means of the converted virtual file system.

* * * * *